Feb. 1, 1927.  1,616,019
C. H. WISE
PIPE CLAMP
Filed Sept. 14, 1925
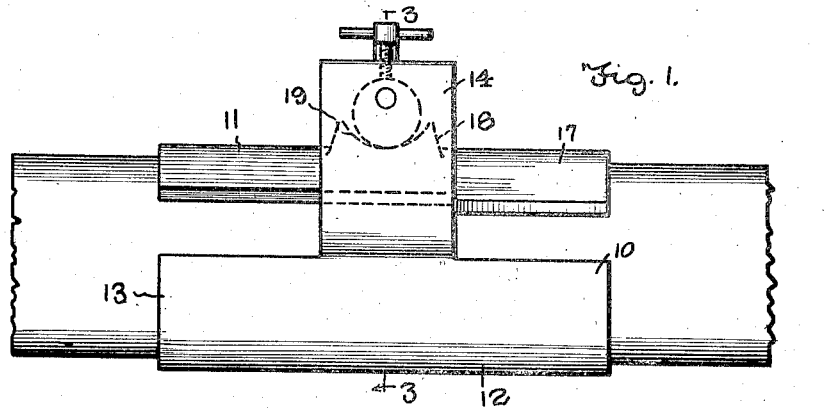
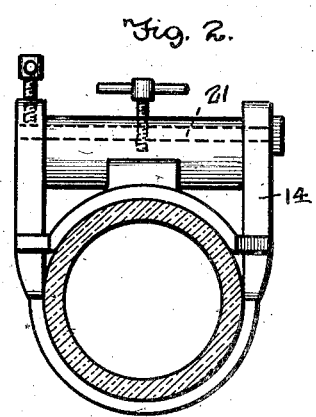 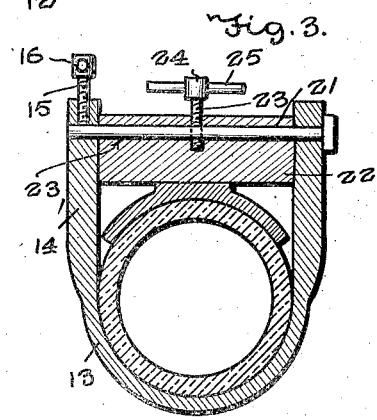
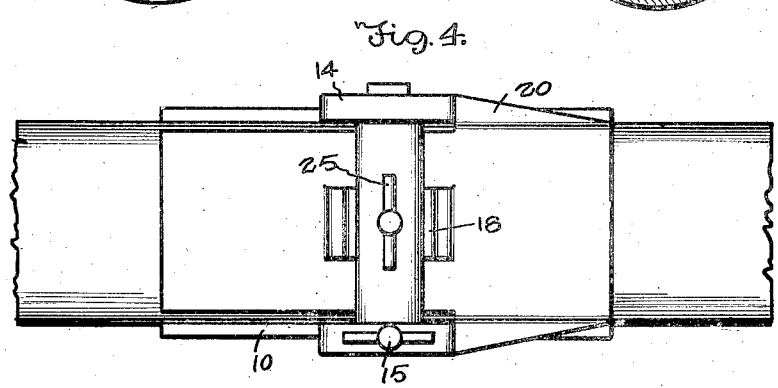
Charles H. Wise, Inventor
Witnesses
C. E. Churchman Jr.
By Richard B. Owen.
Attorney Patented Feb. 1, 1927.

1,616,019

UNITED STATES PATENT OFFICE.

CHARLES H. WISE, OF NEW LEXINGTON, OHIO.

PIPE CLAMP.

Application filed September 14, 1925. Serial No. 56,393.

This invention relates to improvements in attachments adapted to be mounted in association with pipes and the like to prevent leakage of matter through any apertures which may have been formed therein.

An important object of the invention is to provide a pipe clamp which may be quickly and conveniently mounted upon a pipe and will efficiently close any openings through which the matter being conducted by the pipe, may escape.

Another object of the invention is the provision of a pipe clamp of the above character which may be very securely positioned upon the pipe without great difficulty.

Still another object of the invention is the provision of an efficient and easily operable pipe clamp of simple and durable design and which may be placed upon the market at a relatively low cost.

Other objects and advantages of this invention will become apparent as the description progresses.

In the accompanying drawing forming a part of this specification and in which like numerals are employed to designate corresponding parts throughout the same:

Figure 1 is a side elevation of a clamping apparatus constructed in accordance with my invention, shown in association with a pipe section, Figure 2 is an end elevation of the same, Figure 3 is a transverse sectional view taken on the line 3—3 of Figure 1, and Figure 4 is top plan view of the same.

In the drawing, wherein for the purpose of illustration is shown the preferred embodiment of my invention, the numeral 10 generally indicates my improved clamp device composed of an upper section 11 and a lower co-acting section 12. In carrying out my invention, it is intended to so connect these sections in association with a pipe or hose, as to cause the members to be tightly positioned over an opening which may be formed in the pipe so as to render the pipe leakproof.

Referring now more specifically to the structure embodying my invention, it is to be noted that the lower section 12 embodies a bottom plate 13 of substantially semi-circular formation adapted to firmly embrace the lower portion of a pipe. Formed integral with the plate 13 and extending upwardly from the edges thereof are a pair of side plates or ears 14 preferably positioned at the central portion of the plates 13 and arranged in parallel positions at each side of the pipe. Each of these plates is provided with an aperture adjacent its upper edge, these apertures being in transverse alignment and one of the side plates or ears is further provided with a vertical internally threaded bore communicating with the said aperture. This bore is intended to receive a set screw 15 having formed on its upper extremity an enlarged head 16 provided with a transverse bore, the purpose of which will become apparent as the description progresses.

The upper co-acting section 11 is composed of a top plate 17 of substantially the same length as the bottom plate 12 and adapted to be positioned in opposed relation thereto. This plate is also of arcuate formation preferably in the form of a quadrant in cross section. Formed on the top at the central portion of the plate 17 is a seat structure 18 provided with a transversely extending arcuate recess 19 for engagement with a suitable fastening element which will be presently described. Formed on one end of the top plate 17 and extending laterally from the edges thereof are a pair of tapered ribs 20, shown to advantage in Figure 4, these ribs being adapted to bear against the side plates or ears 14 and prevent longitudinal movement of the plate.

The foregoing sections are preferably constructed of durable metal or similar material adapted to conform to the contour of the pipe and to be firmly pressed in position thereon. While I have not considered it necessary, attention is invited to the fact that suitable packing material of conventional design may be positioned between the plates and pipes for more effectively clamping the pipes when desirable.

In order to tightly compress the clamp sections upon the pipes and retain these co-acting members in this position, I provide a transverse shaft 21 engageable with the openings formed in the ears 14, this shaft being secured in position by means of the set screw 15 and prevented against accidental displacement. Rotatably mounted upon the shaft 21 is a cylindrical sleeve 22, this sleeve being provided with an eccentric longitudinally extending bore 23. As is obvious from the drawing, the sleeve 22 extends between the inner edges of the side plates and is freely rotatable about the shaft 21. This sleeve is slidably engageable with the seat 18 and upon rotation exerts a cam action on the sections, due to the eccentric positions of the shaft 21.

In order to facilitate the rotatable movement of the sleeve a transverse bore is drilled through a portion of the sleeve and the shaft, this bore being in alignment and engageable with a pin 23. The upper end of the pin is provided with an enlarged head 24 through which is formed a transverse opening adapted to receive a removable rod 25. This construction will enable the sleeve to be readily rotated so as to firmly press the sections upon the pipes. When the proper adjustment is obtained, the shaft is held against further movement by rotation of the set screw 15 and the clamp securely held in position.

As can be readily seen from the foregoing description and the drawings, a clamping apparatus of extremely simple and durable design is provided. The structure is arranged so as to be conveniently attached upon the pipe and may be firmly wedged in association therewith.

It is to be understood that the device is susceptible of modification and that various changes as to the shape, size and arrangement of parts may be resorted to without departing from the spirit of the invention, or the scope of the subjoined claims.

Having thus described my invention, I claim:

1. An apparatus of the class described including a pair of co-acting sections, the bottom section embodying a curved plate, a pair of parallel ears formed on the sides of the plate, the upper section embodying a curved plate in opposed relation with the bottom plate, a seat formed on the upper plate, and an eccentrically mounted rotatable member engageable with the seat formed on the upper plate adapted to force the member tightly in engagement with a pipe section or the like.

2. A pipe clamp comprising, in combination, a pair of co-acting sections, the lower section embodying a curved bottom plate adapted to firmly engage the lower portion of a pipe section, a pair of vertically extending ears formed on the lower plate and extending at the sides of the upper section, an upper section embodying a curved plate disposed in opposite relation with the bottom plate, a seat having a curved recess formed on the top plate, a transverse shaft mounted in and extending between the bottom plate ears, a sleeve rotatably mounted on the shaft, and means for conveniently rotating the said sleeve and shaft.

3. A pipe clamp comprising a lower section embodying a curved bottom plate, a pair of ears formed on the upper edges of the bottom plate and extending vertically upward, a co-acting top section embodying a curved top plate, a seat having an arcuate recess formed on the central portion of the top plate, a shaft rotatably mounted in suitable openings formed in the ears, a sleeve having an eccentric bore rotatably mounted on the shaft, means for readily rotating the said sleeve and shaft and causing the sleeve to firmly engage the seat formed on the top plate, and means for securing the shaft against movement.

4. A pipe clamp comprising, in combination, a pair of co-acting sections, the lower section embodying a curved bottom plate engageable with the bottom portion of a pipe section, a pair of ears formed on the edges of the bottom plate and extending vertically in parallel positions, the top co-acting section embodying a curved top plate disposed on the upper portion of the pipe section in opposed relation to the bottom plate, a seat formed on the central portion of the top plate having an arcuate recess, a transversely extending shaft mounted through suitable openings in the parallel ears, a sleeve rotatably mounted on the shaft having a longitudinal bore engageable with the shaft, the said bore being formed eccentrically in the sleeve, a pin adapted to engage an aligned bore formed in the central portion of the sleeve and shaft, for rotating the shaft, the central portion of the sleeve being firmly engageable with the seat formed on the top plate for forcing the sections tightly on the pipe, and a set screw threadedly mounted in one of the ears for securing the shaft in locked position.

5. In a pipe clamp, a pair of coacting pipe engaging sections adapted to embrace a pipe, a transverse shaft mounted in opposed projections formed on the upper section, an eccentric sleeve rotatably mounted on the said shaft engageable with the coacting section, and means whereby the sleeve may be rotated to compress the sections about the pipe.

In testimony whereof I affix my signature.

CHARLES H. WISE.